United States Patent
Regenass et al.

[15] 3,669,936
[45] June 13, 1972

[54] POLYDIMERCAPTO-S-TRIAZINES

[72] Inventors: Franz Regenass, Oristalstrasse 45, Liestal; Peter Christoph Schlumbom, Vorderbergweg 1a, Therwil; Hansjorg Heller, Dörnliweg 1, Riehen, all of Switzerland

[22] Filed: Aug. 22, 1969

[21] Appl. No.: 852,452

[30] Foreign Application Priority Data

Aug. 30, 1968 Switzerland .......................... 13088/68

[52] U.S. Cl. ................... 260/77.5 AQ, 117/124 E, 117/133, 117/148, 260/18 N, 260/30.8 DS, 260/31.2 N, 260/32.8 N, 260/33.2 R, 260/33.4 UR, 260/33.6 UB, 260/33.8 UB, 260/37 N, 260/47 R, 260/79, 260/77.5 AP, 260/79.1, 260/248 CS
[51] Int. Cl. ..................................................... C08g 22/04
[58] Field of Search ............. 260/79, 79.1, 248 CS, 77.5 AQ, 260/77.5 AP, 47 R

[56] References Cited

UNITED STATES PATENTS

| 2,640,047 | 5/1953 | Thurston ................................. 260/79 |
| 3,366,598 | 1/1968 | Westlinning et al. .................. 260/41.5 |

*Primary Examiner*—Donald E. Czaja
*Assistant Examiner*—M. I. Marquis
*Attorney*—Karl F. Jorda and Martin J. Spellman

[57] ABSTRACT

Polydimercapto-s-triazines and crosslinked polydimercapto-s-triazines are useful as lacquers and adhesives. An embodiment is a copolymer of 2-[Bis-(2-ethylhexyl)-amino]-4,6-dimercapto-s-triazine and 2-(N-n-butyl-N-$\beta$-hydroxyethylamino)-4,6-dimercapto-s-triazine crosslinked with hexamethylene diisocyanate.

9 Claims, No Drawings

POLYDIMERCAPTO-S-TRIAZINES

DETAILED DISCLOSURE

The present invention relates to polydimercapto-s-triazines and crosslinked polydimercapto-s-triazines and a process for the production of such polymers. The new polymers are particularly useful as lacquers and adhesives.

Previously, in oxidizing dimercapto-s-triazines, only monomeric, dimeric and trimeric oxidation products have been obtained. Surprisingly, it has now been found that new polydimercapto-s-triazines are obtained, consisting of a. 0 - 100 % by weight of the structural element of the formula I

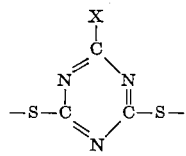
(I)

(b) 0–50% by weight of the structural element of the Formula II

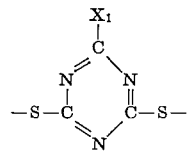
(II)

(c) 0–34% by weight of the structural element of the Formula III

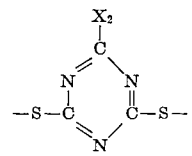
(III)

wherein
X, $X_1$ and $X_2$
represent a five to seven-membered nitrogen heterocycle bound by way of nitrogen to the triazine ring, an unsubstituted or substituted alkoxy group, preferably an alkoxy, hydroxyalkoxy, phenoxyalkoxy or alkoxyalkoxy group, having at most 18 carbon atoms, a cycloalkoxy group,
preferably having five to 12 carbon atoms, and alkenyloxy group, preferably having three to 18 carbon atoms, an aralkoxy group, preferably having seven to 12 carbon atoms with a monocyclic aryl part, unsubstituted or substituted by lower alkyl, lower alkoxy, bromine or chlorine, phenoxy, phenoxy substituted by halogen, or the group of the formula

wherein $R_1$ is an aliphatic group, preferably an alkyl, carboxyalkyl, alkoxycarbonylalkyl, hydroxyalkyl, alkoxyalkyl, carbacyloxyalkyl containing at most 20 carbon atoms, whereby the carbacyl belongs to the aliphatic or monocarbocyclic aryl series, allyl or methallyl group, in particular, preferably an alkyl group containing one to 12 carbon atoms, a cycloaliphatic group, preferably the cyclohexyl group, an araliphatic group, preferably an aralkyl group containing at most 15 carbon atoms, unsubstituted or substituted by alkyl, alkoxy, bromine or chlorine, or an aromatic group, preferably a monocyclic aryl group containing at most 12 carbon atoms, unsubstituted or substituted by alkyl, alkoxy, bromine or chlorine, and $R_2$ is hydrogen or the same as $R_1$, in particular, preferably an alkyl group containing one to 12 carbon atoms, or the hydroxyethyl group or a hydroxypropyl group, whereby $R_1$ and $R_2$, in particular, preferably contain together at least six carbon atoms preferably with the priviso that in X the sum of the carbon atoms free from double-bonds and optionally present oxygen and nitrogen atoms is at least seven, and in $X_1$ the sum of the carbon atoms is at least three, and d. 0–100 percent by weight of the structural element of the formula IV,

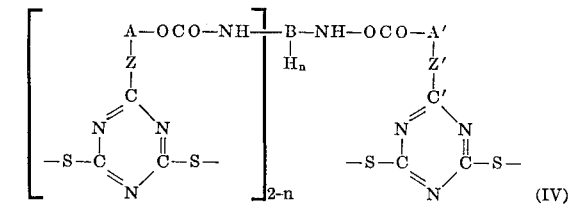
(IV)

wherein
Z and Z'
represent, independently of each other, —O—, —S— and —NR— and R represents hydrogen or an unsubstituted or substituted alkyl group, preferably an alkyl, alkoxyalkyl and hydroxyalkyl group having at most 20 carbon atoms, or an aralkyl group, and
A and A'
denote, independently of each other, an alkylene group, preferably having two to three carbon atoms,
B—$H_n$ represents the organic radical of a di or triamine and n represents 0 or 1, and
B represents, where n = 1, preferably an alkylene group containing two to 36 carbon atoms, a ω,ω'-xylylene group, an m- or p-phenylene group, unsubstituted or substituted by lower alkyl, bromine or chlorine, or a group of the formula

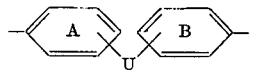

wherein the rings A and B can be substituted by lower alkyl or chlorine and U is the direct bond, the methylene group, an alkyliden group containing 2 to 4 carbon atoms, —O—, —S— or

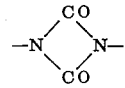

and represents, where n = 0, preferably

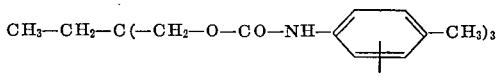

or

—(CH$_2$)$_6$—N[CONH—(CH$_2$)$_6$—]$_2$ and —Z—A— and —Z'—A'— represent, in particular, preferably independently of each other, an aminoethyl group of the formula

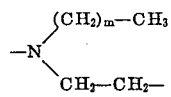

wherein m is 0 to 11,
and whereby heteroatoms contained in the radicals X, $X_1$, $X_2$, A, A', Z, Z' and B, or
bound to these radicals, must be separated from each other preferably by at least one trigonal carbon atom, or by at least two carbon atoms, or instead of (d)

e. 0–3 percent by weight of the structural element of the formula V

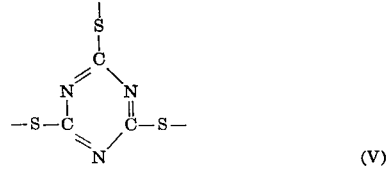
(V)

whereby the percentages are relative to the total weight of the polymer and the structural elements I, II, III and IV or I, II, III and V together constitute 100 percent by weight of the polymer, thus only either the repeating units IV or V are present in a polymer but not both) if one, two, or three exceptionally purified dimercapto-s-triazines of the formula VI

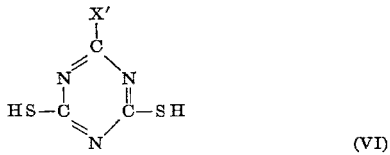

wherein
X'
has the meaning given in the formulas I to III for X, $X_1$ or $X_2$,
is polymerized by oxidation with an oxidizing agent having a Redox potential of −0.36 to −1.77, preferably hydrogen superoxide, optionally in the presence of at most 3 percent by weight of trithiocyanuric acid, relative to the total weight of the polymer. In the case of polydimercapto-s-triazines substituted with hydroxyl groups, optionally by a reaction following the polymerization, the formed polymerisate can be crosslinked with a compound of the formula VII,

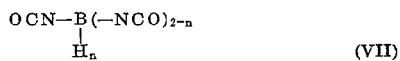

or with the reaction product from 1 mole of trimethylol propane and 3 moles of a mixture consisting of 60–70 parts by weight of the compound of the formula

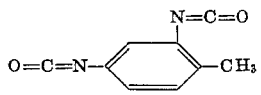

and 30–40 parts by weight of the compound of the formula

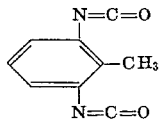

or with the reaction product consisting of 3 moles of hexamethylene diisocyanate and 1 mole of water. In all these cases, the amount of isocyanate used must be so designed that stoichiometrically there are at most 2 isocyanate groups to one free hydroxyl group of the polymer to be used.
Preferably, the following are given as compounds of the formula VI:

2-methoxy-4,6-dimercapto-s-triazine,
2-allyloxy-4,6-dimercapto-s-triazine,
2-phenoxy-4,6-dimercapto-s-triazine,
2-benzyloxy-4,6-dimercapto-s-triazine,
2-diethylamino-4,6-dimercapto-s-triazine,
2-diallylamino-4,6-dimercapto-s-triazine,
2-di-n-butylamino-4,6-dimercapto-s-triazine,
2-di-n-hexylamino-4,6-dimercapto-s-triazine,
2-di-n-octylamino-4,6-dimercapto-s-triazine,
2-di-n-dodecylamino-4,6-dimercapto-s-triazine,
2-[Bis-(2-ethylhexyl)-amino]-4,6-dimercapto-s-triazine,
2-monoethylamino-4,6-dimercapto-s-triazine,
2-mono-n-butylamino-4,6-dimercapto-s-triazine,
2-mono-n-hexylamino-4,6-dimercapto-s-triazine,
2-mono-n-octylamino-4,6-dimercapto-s-triazine,
2-mono-n-decylamino-4,6-dimercapto-s-triazine,
2-dibenzylamino-4,6-dimercapto-s-triazine,
2(-N-methyl-N-dodecyl-amino)-4,6-dimercapto-s-triazine,
2-(N-ethyl-N-dodecyl-amino)-4,6-dimercapto-s-triazine,
2-(N-methyl-N-cyclohexyl-amino)-4,6-dimercapto-s-triazine,
2-cyclopentamethylene-imino-4,6-dimercapto-s-triazine,
2-cyclohexamethylen-imino-4,6-dimercapto-s-triazine,
2-morpholino-4,6-dimercapto-s-triazine,
2-[bis-(β-hydroxyethyl)-amino]-4,6-dimercapto-s-triazine,
2-(N-n-butyl-N-β-hydroxyethyl-amino)-4,6-dimercapto-s-triazine,
2-(N-n-hexyl-N-β-hydroxyethyl-amino)-4,6-dimercapto-s-triazine,
2(N-n-octyl-N-β-hydroxyethyl-amino)-4,6-dimercapto-s-triazine,
2-(N-n-butyl-N-phenyl-amino)-4,6-dimercapto-s-triazine, Suitable as compounds of the formula VII are, for example, the following:
tetramethylene diisocyanate, hexamethylene diisocyanate, m-xylylene-ω,ω'-diisocyanate, p-xylylene-ω,ω'-diisocyanate, phenylene-1,3-diisocyanate, chlorobenzene-2,4-diisocyanate, toluylene-2,4-diisocyanate, toluylene-2,6-diisocyanate, 4,4'diphenylmethane-diisocyanate, 4,4'-diphenyl-diisocyanate, 4,4'-diphenylether-diisocyanate, 4,4'-dicyclohexyl-methane-diisocyanate, a diisocyanate produced according to the Belgian Patent specification 668,214 from dimerized oleic acid.

The new open-chained polydimercapto-s-triazines are produced by reacting particularly purified compounds of the formula VI with an oxidizing agent. It is possible thereby to use either a single compound of the formula VI or a mixture of two or three compounds of the formula VI differently substituted in 2-position. The oxidizing agent possesses in aqueous solution a standard oxidation-potential of −0.36 to −1.77 volt. The term—standard oxidation potential—is defined in Latimer's book, "The Oxidation States of the Elements and their Potentials in Aqueous Solutions," 2nd Edition, Prentice-Hall, Inc., Englewood Cliffs, N.J., 1952, pages 340–348.

The following are mentioned as oxidizing agents: potassium-iron III-cyanide, elementary iodine, nitrous acid or oxygen in the presence of catalytic amounts of nitrous acid, elementary chlorine, elementary bromine. Preferably however, hydrogen peroxide is used as oxidizing agent, because in this case, the formed polymers are obtained completely colorless, which is not automatically the case with regard to the other mentioned oxidizing agents.

The polymers, according to the invention, can be produced by solution polymerization and emulsion polymerization at temperatures of 0° to 100°C, preferably at 20° to 60°C. In the case of solution polymerization a compound of the formula VI, or a binary or a tertiary mixture of compounds of the formula VI having different substituents in 2-position, is reacted in a solvent mixture with an oxidizing agent. One component of this solvent mixture is a solvent not miscible with water to any extent, in which the polymer to be formed is readily soluble, whilst the second component consists of water or of a mixture of water and a water-miscible organic solvent. Examples of solvents not miscible with water are: esters of acetic acid, ethyl butyl ketone, aromatic hydrocarbons such as benzene, toluene, xylene; chlorinated hydrocarbons such as chlorobenzene, methylene chloride, chloroform, carbon tetrachloride, trichloroethane, tri- and perchloroethylene. Suitable water-miscible solvents are: methanol, ethanol, isopropanol, acetone, dioxane, glycolmonomethyl ether, glycolmonoethyl ether, tetrahydrofuran, dimethylacetamide, dimethylformamide, dimethylsulphoxide.

After the reaction is completed, the polymer remains dissolved in the nonaqueous phase and can be further used, optionally after drying, as solution. Alternatively, the polymer can be isolated, e.g. by removal of the solvent or by precipitation with a non-solvent, such as methanol.

In the case of emulsion polymerization a compound of the formula VI, or a binary or a tertiary mixture of compounds of the formula VI having different substituents in 2-position, is dispersed by vigorous stirring in a diluted aqueous solution of a wetting agent and the oxidizing agent is added in the form of an aqueous solution. After the reaction has finished, the small amount of coagulum formed is separated by filtration. The polymer is then in the form of an aqueous stable emulsion. To obtain the solid polymer, the product is coagulated, according to known methods, by the addition of electrolyte solution and subsequently isolated. The emulsion polymerization can also be performed in the absence of a wetting agent. In this case, for the purpose of obtaining a better dispersibiltiy of the monomer, a portion of the water is replaced by a water-miscible solvent, such as methanol.

Solutions of the polymers produced according to the invention, are used as adhesives. The polymer solution is applied to the surfaces of work material to be glued together, and the solvent removed. Under pressure and at elevated temperature, it is then possible to glue the work pieces together. The polymers, produced according to the invention, are particularly suitable for the production of laminated glass because of their high transparency and on account of their high resistance to the harmful effects of light.

The polydimercapto-s-triazines, substituted with hydroxylalkylamino groups, can be cross-linked. To the solution of a suchlike polymer is then added the solution of an isocyanate of the formula VII, or of a reaction product from trimethylol propane and a toluylene diisocyanate mixture, or of a reaction product from hexamethylene diisocyanate and water, or of a diisocyanate produced according to the Belgian Patent specification No. 668,214 from dimerized oleic acid and, optionally, an accelerator such as dibutyl tin laurate. The amount of the isocyanate used of the formula VII is so designed that there are at most two isocyanate groups to one free hydroxyl group of the polymer to be used.

Such solutions, brushed or sprayed on to wood or metals, produce after removal of the solvent, and after a hardening period at room temperature, or at elevated temperature up to 150°C, clear, tenacious lacquers having a good surface hardness, high resistance to harmful effects of sunlight and good stability to hydrolysis. Before applying the solutions as lacquer coatings, known additives, such as pigments and dyestuffs, can be mixed in with them.

In producing insoluble lacquers by cross-linking with isocyanates of the formula VII, it is frequently desirable to start with polydimercapto-s-triazines of low molecular weight and therefore low solution viscosity. For this purpose, the, in themselves, high-polymeric products obtained in the case of emulsion polymerization according to the invention, can be decomposed by known methods to give products having a low degree of polymerization and therefore a lower solution viscosity. The method, consisting of treating the emulsion of the high-polymeric polydimercapto-s-triazine with an aqueous solution of alkali hydrogen sulphide and alkali sulphite, is described in the "Methoden der organischen Chemie" ("Methods of organic Chemistry") by Houben-Weyl IV Edition, Vol. XIV/2, p. 595, Stuttgart 1963.

As adhesives and lacquers, such polydimercapto-s-triazines are preferably used wherein, in the structural element of the formula I in X, the sum of carbon atoms free from double bonds and optionally present oxygen and nitrogen atoms is at least 7, and in the structural element of the formula II in $X_1$, the sum of the carbon atoms is at least 3. Polymers, according to the invention, which lie outside this preferred definition, are brittle and are therefore more difficult to work.

Furthermore, as adhesives and lacquers, such polydimercapto-s-triazines are preferably used, in the structural elements of which of the formulas I, II, III and IV, the heteroatoms contained in the radicals X, $X_1$, $X_2$, A, A', Z, Z' and B, or the heteroatoms bound to these radicals, are separated from each other by at least one trigonal carbon atom or by at least two carbon atoms. The polydimercapto-s-triazines lying outside this preferred definition are sensitive to hydrolysis and are therefore poorly suited for use.

Surprisingly, the polymerization of dimercapto-s-triazines to open-chained polymers is in that case successful where particularly purified starting substances of the formula VI are used. As the hitherto known purification processes for these compounds do not yield a sufficiently high degree of purity, the mercapto-s-triazines were purified according to a new process. Claimed in the French Patent specification No. 697,599 is the purification of dimercapto-s-triazines with the aid of ammonium, alkali or alkaline-earth salts. The purification process therein described consists of precipitating, using acid, the free dimercaptane from the aqueous solution of its salt. Colored and ill-smelling impurities are indeed removed by this purification process, but even after repeated precipitation, the dimercapto-s-triazines are not pure enough to be oxidized to high-polymeric disulphides If, on the other hand, according to the invention, the crude dimercapto-s-triazines are reacted in methanolic solution with aqueous ammonia to the monoammonium salts, these being then isolated by crystallization and again recrystallized from aqueous methanol, monomers are obtained which are previously and subsequently described as being especially purified and which possess the degree of purity necessary for obtaining high molecular weights.

The production of the dimercapto-s-triazines of the formula VI is carried out according to the method, described in the French Patent specification No. 697.599, by reaction of dichloro-s-trizines with sodium hydrogen sulphide. To thereby accelerate the reaction, ethoxyethanol (Cellosolve) is advantageously used as solvent instead of water.

The isocyanates of the formula VII are produced according to known methods, e.g. by reaction of diamines or diamine chlorohydrates or carbamic acid salts with phosogene, as described in the "Methoden der Organischen Chemie" by Houben Weyl, IV Edition, Vol. VIII, pp. 119–123, Stuttgart 1952. The production of the reaction product from hexamethylene diisocyanate and water and of the reaction product from trimethylol propane and the toluylene diisocyanate mixture is described in the "Methoden der Organischen Chemie," by Houben Weyl, IV Edition, Vol. XIV, part 2, pp. 66 and 69, Stuttgart 1963.

Evidence of an actually occurred polymerization is obtained by the comparison of the infra-red and Raman spectra of the polymers with those of the starting monomers and the inherent viscosity of the polymers. The monomeric dimercaptotriazines, exhibit, determined as free mercaptanes, absorption bands in the region of 2,85 to 3.20$\mu$ (wave-number 3,500 to 3,125 cm$^{-1}$). After polymerization has been effected in accordance with the invention, these bands no longer appear in the products; on the contrary, the polymers exhibit broad absorption in the remote infra-red at 20 to 25 $\mu$ (wave number 500 to 400 cm$^{-1}$). Moreover, there appears in the region of 10 to 200 $\mu$ (wave number 1,000 to 50 cm$^{-1}$) a pronounces Raman-line which is not present in the case of the monomers.

The following examples are designed to illustrate the invention, but without limiting it. The temperatures are given in degree Centigrade. The usual characteristic values used to identify plastics are applied according to the following definition.

Inherent viscosity ($\eta_{inh.}$) = $\ln \eta_{rel}/c$, whereby c denotes the concentration of the polymer in g/100 ml of solvent and $\eta_{rel}$ represents the quotient: running time of the solution of the polymer with the concentration c divided by the running time of the pure solvent. The running times are determined by using an Ostwald Capillary Viscosimeter at 25°C in a concentration of 0.5 g of polymer/100 ml of absolute solvent. Where otherwise not expressly stated, toluene was used as solvent.

EXAMPLE 1 a. Purification of 2-dihexylamino-4,6-dimercapto-s-triazine by precipitation from its sodium salt according to the French Pat. No. 697,599.

510 g of crude 2-dihexylamino-4,5-dimercapto-s-triazine are dissolved in 5,000 ml of 3.8 percent sodium hydroxide solution and filtered through diatomaceous earth. The yellow filtrate is acidified, in the cold state, with concentrated hydrochloric acid to obtain a pH-value of about 2, whereby the precipitated product is washed free of acid on the suction filter. This precipitation is repeated. Yield 494 g.

| analysis values: | calculated: | N = 17.05 % |
| --- | --- | --- |
| | obtained: | N = 16.32 % | titration with perchloric acid: 92.2% content of 2-dihexylamino-4,6-dimercapto-s-triazine.

b. Purification of 2-dihexylamino-4,6-dimercapto-s-triazine by recrystallization of its monoammonium salt.

451 g of the same crude product, as was used for the purification test described under 1a., are dissolved in 1,000 ml of warm methanol. To the solution are then added 155 ml of 25 percent ammonium hydroxide and the solution is filtered warm. By cooling the filtrate to 5°, filtering and drying the filtration residue, the product is obtained as fine, white needles, which are again recrystallized from a mixture of 3,000 ml of methanol and 500 ml of water. Yield 384 g,

| analysis values: | calculated: | $N = 20.27\%$ |
| | obtained: | $N = 20.31\%$ | titration with $HClO_4$ in glacial acetic acid
 1. End point: 99.8% consumption of $HClO_4$.
 2. End point: 99.0% consumption of $HClO_4$.

This product is adequate for the polymerization according to the invention, whereas the material obtained according to 1a yields unsatisfactory results.

The following are purified analogously:
2-(N-n-butyl-N-phenylamino)-4,6-dimercapto-s-triazine
2-(N-n-butyl-N-β-hydroxyethylamino)-4,6-dimercapto-s-triazine
2-(N-hexyl-N-β-hydroxyethylamino)-4,6-dimercapto-s-triazine
2-[bis-(β-hydroxyethyl)-amino]-4,6-dimercapto-s-triazine
2-allyloxy-4,6-dimercapto-s-triazine
2-mono-octylamino-4,6-dimercapto-s-triazine
2-mono-ethylamino-4,6-dimercapto-s-triazine
2-mono-n-butylamino-4,6-dimercapto-s-triazine
2-mono-n-hexylamino-4,6-dimercapto-s-triazine
2-mono-n-decylamino-4,6-dimercapto-s-triazine
2-dimethylamino-4,6-dimercapto-s-triazine
2-diethylamino-4,6-dimercapto-s-triazine
2-diallylamino-4,6-dimercapto-s-triazine
2-di-n-butylamino-4,6-dimercapto-s-triazine
2-di-n-octylamino-4,6-dimercapto-s-triazine
2-di-n-dodecylamino-4,6-dimercapto-s-triazine
2-(N-methyl-N-cyclohexyl-amino)-4,6-dimercapto-s-triazine
2-dibenzylamino-4,6-dimercapto-s-triazine
2-(N-methyl-N-dodecyl-amino)4,6- dimercapto-s-triazine
2-(N-ethyl-n-dodecyl-amino)-4,6-dimercapto-s-triazine
2-morpholino-4,6-dimercapto-s-triazine
2-[bis-(2-ethylhexyl)-amino]-4,6-dimercapto-s-triazine The purification of the latter mentioned dimercapto-s-triazine differs from purification of the other dimercapto-s-triazines insofar as the substance in the presence of ammonium hydroxide does indeed crystallize as ammonium salt, but that the latter loses ammonia during drying in vacuo and yields the free, pure dimercapto-s-triazine.

EXAMPLE 2

Solution polymerization of 2-dihexylamino-4,6-dimercapto-s-triazine.

a. Polymerization with potassium ferricyanide.

To a mixture consisting of 200 ml of methanol, 80 ml of benzene and 27.6 g of the monoammonium salt of the 2-dihyxylamino-4,6-dimercapto-s-triazine is added, while stirring well and within 2 hours, a solution of 26,4 g of potassium ferricyanide in 70 ml of water. After addition of the oxidizing agent has been completed, the solution is made acid by adding concentrated sulphuric acid and stirring proceeds for a further 15 minutes at room temperature. After addition of a further 200 ml of benzene, the organic phase is separated and concentrated by evaporation to dryness. The green-colored polymer is dissolved in 100 ml of chloroform and precipitated by the solution being poured into 1,000 ml of methanol.
Yield: 17 g
$\eta$ inh. = 0.10 b. Polymerization with iodine.

To a suspension of 10.3 g of the ammonium salt of the 2-dihexylamino-4,6-dimercapto-s-triazine, 2.4 g of NaOH as 30.8 % solution, 50 ml of toluene and 50 ml of water is added within 1 hour, while stirring and at room temperature, a solution of 8.5 g of iodine (= 10 mol percent excess) in 100 ml of toluene. After a further three hours, the unconsumed iodine is reduced with sodium thiosulphate solution. The precipitating aqueous phase is separated and the organic phase poured into 1,000 ml of methanol. The precipitated polymer is dissolved in 100 ml of chloroform and is again precipitated by being poured into 1,000 ml of methanol.
Yield: 5.5 g
$\eta$ inh. = 0.16.

c. Polymerization with bromine.

To a suspension of 10.3 g of ammonium salt of the 2-dihexylamino-4,6-dimercapto-s-triazine, 2.4 g of sodium hydroxide as a 30.8 percent solution, 50 ml of carbon tetrachloride and 50 ml of water is added, while stirring and within 1 hour, a solution of 4.8 g of bromine in 50 ml of carbon tetrachloride. The suspension is divided into two equal parts and stirred for a further 3 hours, after having added to the one half a further 0.5 g of bromine (20 mol percent excess). The polymers are isolated from the two suspensions and, as described under example 1b, purified. From the suspension oxidixed with the theoretical amount of bromine are obtained 2.5 g of polymer, and 1.8 g from the suspension oxidized with an excess amount of bromine. Both polymers have the identical viscosity $\eta$ inh. = 0.08.

d. Polymerization with nitrous acid.

27.6 g of 2-dihexylamino-4,6-dimercapto-s-triazine are oxidized as described in example 2 a., whereby instead of the potassium ferricyanide, 11.0 g of sodium nitrite dissolved in 140 ml of water with 50 ml of 20 percent sulphuric acid are used. The polymer is obtained, after separation of the aqueous phase, by pouring the organic phase into 800 ml of methanol. 5 g of a viscous substance are obtained, of which 14.1 g are dissolved in 80 ml of chloroform, filtered and again precipitated by being poured into 800 ml of methanol.
Yield: 12.7 g
$\eta$ inh. = 0.32.

e. Polymerization with oxygen in the presence of catalytic amounts of nitrous acid.

A shaking mixer is charged with 6.9 g of ammonium salt of the 2-dihexylamino-4,6-dimercapto-s-triazine, 150 ml of water, 30 ml of toluene, 0.4 g of a cation-active wetting agent, 0.05 g of sodium nitrite and 1.2 ml of 96 percent sulphuric acid. The mixing vessel is immediately connected to a gasometer filled with oxygen, and shaken. After 100 minutes, the theoretical amount of 225 ml of oxygen (calculated to normal conditions) has been absorbed and the reaction ceases. The aqueous phase is separated and the organic phase poured into 500 ml of methanol. The precipitated polymer is reprecipitated from chloroform solution by being poured into methanol.
Yield: 6.0 g
$\eta$ inh. = 0.35.

f. Polymerization with hydrogen peroxide in acid medium.

10.4 g of the ammonium salt of the 2-dihexylamino-4,6-dimercapto-s-triazine are dissolved, in a solvent mixture of 50 ml of dimethyl sulphoxide and 100 ml of toluene. The pH-value of the solution is adjusted to 5 by the addition of about 14 ml of 14 percent acetic acid. To this solution are then added, at 40° by shaking with a vibrating mixer and within 7 hours, 16.5 ml of 11.4 percent hydrogen peroxide solution. After the reaction has ceased, the mixture is poured into 700 ml of methanol in order to precipitate the polymer. To purify the product, it is broken up in methanol suspension in a mixer.
Yield: 9.0 g,
$\eta$ inh. = 0.71,
softening temperature 105°–120°.

5.0 g of this polymer are dissolved in 500 ml of chloroform and 320 ml of methanol are slowly added. After standing for several days at room temperature, the deposit is isolated by decanting and washed with boiling methanol.

Yield: 2.1 g,
η inh. = 1.10.

g. Polymerization with hydrogen peroxide in alkaline medium.

34.6 g of ammonium salt of the 2-dihexylamino-4,6- dimercapto-s-triazine are dissolved in 240 ml of water containing, in the dissolved state, 4.0 g of sodium hydroxide. While mixing with a vibromixer, an addition is made of 0.4 g of iodine dissolved in 200 ml of methylene chloride. 30 ml of 11.4 percent hydrogen peroxide solution are then added within 1 hour, the pH value is adjusted to 8 with several drops of glacial acetic acid and a second portion of 30 ml of 11.4 percent hydrogen peroxide solution is added within 1 hour. The pH value is then adjusted to 5–6 using glacial acetic acid and, in order to break down excess peroxide, 10 percent sodium thiosulphate solution is added until the brown discoloration, caused by the precipitated iodine, just disappears. The formed emulsion is poured into 2,000 ml of methanol and the precipitated polymer purified by reprecipitation.

Yield: 25 g (yellowish)
η inh. = 0.27

By variations in the system of solvents, the amount and type of the oxidizing agent and the pH-value, an effect is had on the molecular weight of the produced polymer and on the yield.

salt of the 2-dihexylamino-4,6-dimercapto-s-triazine in 1,000 ml of a 0.5 percent solution of a non-ionogenic wetting agent. Maintaining the same speed of stirring, 64 ml of an 8.5 percent hydrogen peroxide solution is added dropwise within 45 minutes with stirring then proceeding for a further 15 minutes. The temperature of the reaction mixture thereby increases from 25° to 50°. The formed emulsion is filtered off, whereby 1.5 g of a coagulum (η inh. = 0.55) is obtained. The polymer having a η inh. of 0.36 is obtained from a specimen of the filtered emulsion by addition of acetic acid. A quarter of the total volume of the emulsion is subsequently oxidized with 5 ml of 8.5 percent hydrogen peroxide solution for 0.5 hours, whereby only a little coagulum is formed. The polymer, precipitated from a sample of this afterwards oxidized emulsion, possesses a η inh. of 0.62.

A second sample of the afterwards oxidized emulsion is treated with 10 percent by moles—relative to the solid content of the emulsion—of sodium hydrogen sulphide and 50 percent by moles of sodium sulphite for 15 minutes at 50°. The polymer precipitated by addition of acetic acid has a η inh. of 0.02.

b. 2.4 ml of an 8.5 percent hydrogen peroxide solution are added within 0.5 hours to a suspension—stirred by a magnetic

TABLE I

| Ex. No. | Amount (g.) of monomer | R | Amount (ml.) organic phase | Organic phase | Amount (ml.) water | Amount oxidising agent, ml. | Oxidising agent | Temp., °C | pH at beginning | η inh | Yield, g. | Remarks |
|---|---|---|---|---|---|---|---|---|---|---|---|---|
| 3 | 10.4 | Hexyl | 50 / 125 | Dimethylformamide / Toluene | 2.5 | 3.5 | H₂O₂ (30%) | 20 | 7–8 | 0.32 | 7 | |
| 4 | 3.5 | ...do | 20 | Methylene chloride | 20 | 6.0 | H₂O₂ (11.4%) | 20 | 10 | 0.30 | 3.2 | |
| 5 | 20.0 | Octyl | 100 | ...do | 120 | 14.9 | H₂O₂ (11.4%) | 40 | 10 | 0.24 | 15 | Iodine addition. |
| 6 | 8.0 | ...do | 60 | Chloroform | 60 | 7.2 | H₂O₂ (11.4%) | 40–45 | 10 | 0.45 | 7.0 | Do. |
| 7 | 8.0 | ...do | 50 / 40 | Methanol / Benzene | 18 | ¹2.8 | NaNO₂ / O₂ | 10–50 | ca .4 | 0.43 | 6.2 | Sulphuric acid addition. |
| 8 | 8.0 | ...do | 35 / 35 | Dimethylformamide / Toluene | | 12.0 | H₂O₂ (11.4%) | 40 | <6 | 0.74 | 7.1 | |
| 9 | 8.7 | Butyl | 55 / 100 | Dimethylformamide / Toluene | 10 | 23.0 | H₂O₂ (11.4%) | 40 | <6 | 0.29 | 6.5 | |
| 10 | 12.0 | 2-ethyl-hexyl | 50 / 50 | Dimethylformamide / Toluene | 5 | 3.3 | H₂O₂ (30%) | 40 | <6 | 0.29 | 10.6 | |
| 11 | 7.7 | Dodecyl | 50 / 50 | Dimethylformamide / Toluene | | 3.6 | H₂O₂ (30%) | 40 | <6 | 0.34 | 4.2 | |

¹ Grams.

Such possibilities of variation with regard to the production of homopolymers from monomers of the formula

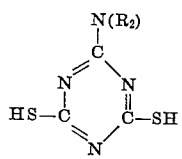

are shown in table I.

Since in the case of the polymers, amorphous bodies are involved, an accurate determination of their melting points, or their transformation points, is possible only with the aid of differential thermoanalysis (DTA). A test of this kind was made on three specimens of the polymers listed in table I.

TABLE Ia

| Example No. | DTA-endothermic peaks (°C) |
|---|---|
| 3 | 91 |
| 6 | 68 |
| 9 | 158 |

EXAMPLE 12

Emulsion polymerization of the ammonium salt of the 2-dihexylamino-4,6-dimercapto-s-triazine.

a. By stirring with a high-frequency stirrer at ca. 3,000 r.p.m., a suspension is produced from 50 g of the ammonium stirrer—of 2.0 g of the ammonium salt of the 2-dihexylamino-4,6-dimercapto-s-triazine in 20 ml of a 0.5 percent solution of a non-ionogenic wetting agent and 2.0 ml of methanol, whereupon stirring continues for a further 1.5 hours at 40°. The emulsion is separated by filtration from 0.20 g of formed coagulum and the polymer precipitated from the emulsion by addition of acetic acid.

Yield: 1.6 g of polymer
η inh. = 0.72.

c. 34.5 g of ammonium salt of the 2-dihexylamino-4,6-dimercapto-s-triazine are added to 600 ml of a 0.02 percent aqueous solution of a non-ionogenic wetting agent. The mixture is cooled to about 5° and to it are then added 11 ml of 31 percent hydrogen peroxide solution, whereupon the air in the vessel is replaced by nitrogen by repeated evacuation and flushing with nitrogen. While stirring with a magnetic stirrer, the contents of the sealed vessel are now heated to 40° and kept for 9 hours at this temperature. The 1.16 g of formed coagulum is then separated by filtration and the polymer precipitated from the emulsion by addition of a 10 percent common salt solution.

Yield: 29.0 g of polymer.
η inh. = 1.24 (reprecipitated)

EXAMPLE 13

Emulsion polymerization of the ammonium salt of the 2-[bis-(2-ethylhexyl)-amino]-4,6-dimercapto-s-triazine. 2.0 g of ammonium salt of the 2-[bis-(2-ethylhexyl)-amino]-4,6-dimercapto-s-triazine are slurried in a mixture of 20 ml of water and 6 ml of methanol and polymerized, while stirring with a magnetic stirrer, with 2.3 ml of 8.5 percent hydrogen peroxide solution. After a reaction time of three hours at 40°, the 0.03 g of formed coagulum is separated by filtration and the polymer is precipitated using acetic acid.

Yield: 1.8 g of polymer
η inh. = 0.57.

EXAMPLE 14

Solution polymerization of 2-mono-n-decylamino-4,6-dimercapto-s-triazine. 9.5 g of ammonium salt of the 2-decylamino-4,6-dimercapto-s-triazine are polymerized under the conditions described in example 2f. and purified by reprecipitation.
Yield: 5.3 g of polymer,
η inh. = 0.12,
softening temperature: 85°–200°.

EXAMPLE 15

Solution polymerization of 2-(N-butyl-N-phenyl-amino)-4,6-dimercapto-s-triazine. 9.3 g of ammonium salt of the 2-(N-butyl-N-phenyl-amino)-dimercapto-s-triazine are polymerized according to the method described in example 2f., and purified by reprecipitation.
Yield: 7.7 g of polymer,
η inh. = 0.62,
Softening temperatures: 165°–180°.

EXAMPLE 16

Copolymer from 2-di-n-octylamino-4,6-dimercapto-s-triazine and di-n-butylamino-4,6-dimercapto-s-triazine.
A mixture of 5.8 g of ammonium salt of the 2-di-n-octylamino-4,6-dimercapto-s-triazine and 8.0 g of ammonium salt of the 2-di-n-butylamino-4,6-dimercapto-s-triazine is polymerized under the conditions described in example 2f. for homopolymerization, and reprecipitated.
Yield: 10.9 g of polymer,
η inh. = 0.69,
softening temperature: 80°–120°.

Some copolymers are listed in table II which are produced analogously to example 16.

TABLE II

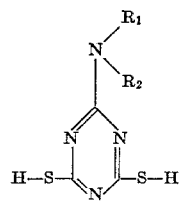

Monomers 1 and 2

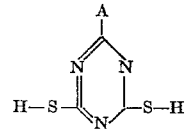

Monomer 3

| Example No. | Monomer 1, $R_1=R_2$ | Amount (g.) | Monomer 2 | Amount (g.) | Monomer 3 | Amount (g.) | $\eta_{ihk}$ | Yield (g.) |
|---|---|---|---|---|---|---|---|---|
| 17 | n-Butyl | 7.2 | $R_1=R_2$=n-hexyl | 8.6 | | 0.45 | 0.45 | 12.8 |
| 18 | do | 5.8 | $R_1=R_2$=n-octyl | 8.0 | | | 0.69 | 1.09 |
| 19 | do | 8.7 | $R_1=R_2$=n-dodecyl | 5.14 | | | 0.31 | 12.2 |
| 20 | do | 8.7 | $R_1$=H; $R_2$=n-octadecyl | 1.0 | | | 0.34 | 8.0 |
| 21 | n-Hexyl | 10.4 | $R_1=R_2$=allyl | 0.77 | | | 0.61 | 8.7 |
| 22 | do | 10.4 | $R_1$=H; $R_2$=n-hexyl | 3.14 | | | 0.68 | 8.3 |
| 23 | do | 10.4 | $R_1=R_2$=benzyl | 1.07 | | | 0.28 | 9.3 |
| 24 | do | 10.4 | $R_1$=4-methyl-benzyl; $R_2$=2-hydroxyethyl | 1.0 | | | 0.40 | 8.5 |
| 25 | do | 10.4 | $R_1$=4-chloro-benzyl; $R_2$=2-hydroxyethyl | 1.6 | | | 0.35 | 8.3 |
| 26 | do | 10.4 | $R_1$=4-ethoxy-phenyl; $R_2$=hydroxyethyl | 1.2 | | | 0.41 | 9.0 |
| 27 | do | 10.4 | $R_1$=2,4-dimethyl-phenyl; $R_2$=hydroxyethyl | 1.0 | | | 0.45 | 8.7 |
| 28 | do | 10.4 | $R_1$=2,4-dichlorophenyl; $R_2$=hydroxyethyl | 1.1 | | | 0.33 | 10.0 |
| 29 | do | 10.4 | $R_1$=3-methoxypropyl; $R_2$=2-hydroxyethyl | 0.8 | | | 0.62 | 8.5 |
| 30 | n-Butyl | 8.7 | | | A=phenoxyl | 0.7 | 0.25 | 8.4 |
| 31 | n-Hexyl | 10.4 | | | A=hexachlorophenoxyl | 1.4 | 0.20 | 10.5 |
| 32 | do | 10.4 | | | A=4-tert. butylbenzyloxyl | 1.0 | 0.31 | 10.2 |
| 33 | do | 10.4 | | | A=4-chlorobenzyloxyl | 0.9 | 0.72 | 9.2 |
| 34 | do | 10.4 | | | A=cyclohexyloxyl | 0.8 | 0.44 | 8.7 |
| 35 | do | 8.7 | $R_1=R_2$=2-hydroxyethyl | 1.0 | A=n-octadecyloxyl | 1.3 | {[1] 0.37} {[2] 0.24} | 9.1 |
| 36 | do | 10.4 | | | A=3-phenoxypropoxyl | 0.95 | 0.35 | 9.7 |
| 37 | do | 10.4 | $R_1$=n-butyl; $R_2$=2-hydroxyethyl | 0.8 | A=10-hydroxy-n-decyloxyl | 1.0 | 0.41 | 10.0 |
| 38 | do | 10.4 | | | A=geranyloxyl | 0.9 | 0.34 | 10.1 |
| 39 | do | 10.4 | | | A=4-dioxythiomorpholino-1 | 0.8 | 0.18 | 7.3 |
| 40 | do | 10.4 | | | A=2-isobutene oxyethoxyl | 0.7 | 0.49 | 9.6 |
| 41 | n-Octyl | 12.0 | $R_1=R_2$=H | 0.53 | | | 1.07 | 10.0 |
| 42 | do | 12.0 | $R_1$=H; $R_2$=ethyl | 1.22 | | | 0.85 | 9.5 |
| 43 | do | 8.0 | $R_1=R_2$=allyl | 0.8 | | | 1.10 | 6.5 |
| 44 | do | 12.0 | $R_1$=butyl; $R_2$=2-hydroxyethyl | 0.8 | | | 0.68 | 10.6 |
| 45 | do | 24.1 | $R_1=R_2$=methoxycarbonylmethyl | 0.96 | | | 0.41 | 22.1 |
| 46 | do | 12.0 | $R_1$=n-butyl; $R_2$=phenyl | 0.93 | | | 1.42 | 11.3 |
| 47 | do | 12.0 | $R_1=R_2$=hydroxyethyl | 1.6 | | | {[1] 0.61} {[2] 0.45} | 10.2 |
| 48 | do | 12.0 | $R_1$=H; $R_2$=n-decyl | 0.95 | | | 0.76 | 9.6 |
| 49 | do | 12.0 | $R_1$=methyl; $R_2$=cyclohexyl | 0.96 | | | 0.74 | 11.1 |
| 50 | do | 24.1 | | | A=allyloxyl | 1.21 | 1.86 | 22.7 |
| 51 | do | 12.0 | | | A=methoxyl | 0.5 | 0.34 | 10.4 |
| 52 | n-Hexyl | 10.4 | $R_1$=2-hydroxyethyl | 1.0 | A=2-ethoxyethoxyl | 0.9 | 0.53 | 8.4 |
| 53 | do | 10.4 | $R_2$=4-ethoxybenxyl | | | | 0.60 | 9.1 |
| 54 | do | 8.7 | $R_1$=butyl; $R_2$=carboxymethyl | 0.9 | | | 0.32 | 6.5 |
| 55 | do | 8.7 | $R_1$=H; $R_2$=octadecyloxy-carbonylmethyl | 1.4 | | | 0.55 | 8.7 |

[1] In toluene.
[2] In butylacetate.

Table II—Continued

| Example No. | Monomer 1 $R_1=R_2$ | Amount (g.) | Monomer 2 | Amount (g.) | Monomer 3 | Amount (g.) | $\eta inh$ | Yield (g.) |
|---|---|---|---|---|---|---|---|---|
| 56 | n-Butyl | 8.7 | $R_1$=hexyl; $R_2$=2-hyhroyypropyl | 3.2 | | | 0.37 | 10.5 |
| 57 | do | 8.7 | $R_1$=H; $R_2$=3-methoxypropyl | 0.75 | | | 0.38 | 7.5 |
| 58 | n-Hexyl | 10.4 | $R_1$=H; $R_2$=4-bromophenyl | 1.0 | | | 0.57 | 8.1 |
| 59 | do | 10.4 | $R_1$=H; $R_2$=4-bromobenzyl | 1.0 | | | 0.81 | 8.6 |
| 60 | do | 10.4 | | | A=4-methoxybenzyloxyl | 0.9 | 0.51 | 8.5 |
| 61 | do | 10.4 | | | A=4-bromobenzyloxyl | 1.0 | 0.40 | 9.7 |
| 62 | do | 8.7 | $R_1$=$R_2$=2-hydroxyethyl | 1.0 | A=4-methylcyclohexyloxyl | 1.1 | 0.45 | 8.9 |
| 63 | do | 8.7 | $R_1$=phenyl; $R_2$=2-hydroxyethyl | 0.85 | A=cyclopentyloxyl | 1.0 | 0.73 | 8.0 |
| 64 | do | 10.4 | | | A=cyclododecyloxyl | 1.0 | 0.55 | 9.9 |
| 65 | n-Octyl | 8.0 | $R_1$=methallyl; $R_2$=hydroxyethyl | 1.4 | | | 0.77 | 8.1 |
| 66 | do | 8.0 | $R_1$=butyl; $R_2$=2-acetyloxyethyl | 1.0 | | | 0.59 | 8.0 |
| 67 | do | 8.0 | $R_1$=butyl; $R_2$=2-benzoyloxyethyl | 1.1 | | | 0.41 | 8.2 |
| 68 | do | 12.0 | $R_1$=H; $R_2$=stearoyloxyethyl | 1.0 | | | 0.73 | 11.2 |

EXAMPLE 69

Urethane lacquer from polydimercapto-s-triazines substituted with hydroxyl groups.

In a toluene solution, 0.094 g of hexamethylene diisocyanate and 1 mg of dibutyl tin laurate, as catalyst, are added to 1.0 g of copolymer having a hydroxyl number of 84 [mg KOH/g polymer], produced according to the method described in example 2f by hydrogen peroxide oxidation of an equimolecular mixture of 2-[bis-(2-ethylhexyl)-amino]-4,6-dimercapto-s-triazine and 2-(n-hexyl-$\beta$-hydroxyethyl-amino)-4,6-dimercapto-s-triazine. From this solution is poured a film which, after evaporation of the solvent, is hardened for about 6 hours in an oven at about 110°. A water-clear lacquer is thus obtained having the pencil-hardness of 3H.

EXAMPLE 70

Urethane lacquer from polydimercapto-s-triazines substituted with hydroxyl groups. 0.117 g of hexamethylene diisocyanate and 0.3 g of $N^2$-dimethyl-$N^4$-diethyl-$N^6$-methyl-$N^6$-butylmelamine, as a softening agent, are added in chloroform solution to 1.0 g of homopolymer, produced from 2-(n-hexyl-$\beta$-hydroxyethylamino)-4,6-dimercapto-s-triazine, having a hydroxyl number of 196 [mg KOH/g polymer]. A film produced from this solution is hardened, after evaporation of the solvent, for 4 hours in an oven at 120°. A glass-clear, viscous lacquer is obtained having the pencil hardness of 6H.

EXAMPLE 71

Urethane lacquer from polydimercapto-s-triazines substituted with hydroxyl groups.

0.33 g of a diisocyanate produced from dimerizated oleic acid, according to Belgian Pat. No. 668,214, are added in toluene solution to 1.0 g of homopolymer from 2-(n-octyl-$\beta$-hydroxyethylamino)-4,6-dimercapto-s-triazine. A film from this solution is hardened, after evaporation of the solvent, for 6 hours in an oven at 120°. The film is glass-clear and viscous. After ageing for 5 days at ca. 25° C, it has a pencil hardness of 4–5H.

EXAMPLE 72

Urethane lacquer from polydimercapto-s-triazines substituted with hydroxyl groups.

A toluene solution of 0.6 g of diphenylmethane-diisocyanate is added in butyl acetate to 2 g of copolymer, having an hydroxyl number of 68 [mg KOH/g polymer] and produced by the method described under 2f., by hydrogen peroxide oxidation of a mixture of 100 parts by weight of 2-dihexylamino-4,6-dimercapto-s-triazine and 63 parts by weight of 2-(n-ethylhexyl-$\beta$-hydroxyethylamino)-4,6-dimercapto-s-triazine. This solution is brushed on to wood and glass plates. After evaporation of the solvent, the films are hardened for 2.5 hours at 80° and subsequently for hours at 100°. Glass-clear, viscous films are thus obtained having the pencil hardness of 4H and a very good adhesive property on wood.

EXAMPLE 73

Urethane lacquer from polydimercapto-s-triazines substituted with hydroxyl groups. 2 g of copolymer, having a hydroxyl number of 63 [mg KOH/g polymer] and produced according to the method described under 2f. by hydrogen peroxide oxidation of a mixture of 60 parts by weight of 2-bis-(2-ethylhexylamino)-4,6-dimercapto-s-triazine and 30 parts by weight of 2-(n-hexyl-$\beta$-hydroxyethylamino)-4,6-dimercapto-s-triazine, are dissolved in butyl acetate and to the solution are added 0.3 g of toluylene diisocyanate dissolved in toluene.

The solution is sprayed on to wood and glass plates. After evaporation of the solvent, the films are hardened for 2.5 hours at 80° and for 3 hours at 100°. The films are glass-clear and have a pencil hardness of 3H with a very good adhesive strength.

EXAMPLE 74

Urethane lacquer from polydimercapto-s-triazines substituted with hydroxyl groups.

29.4 g of copolymer, having a hydroxyl number of 210 [mg KOH/g polymer] and an inherent viscosity of 0.1 (measured in butyl acetate) and produced according to the method described under 2f by hydrogen peroxide oxidation of a mixture of 400 parts by weight of 2-(n-hexyl-$\beta$-hydroxyethylamino)-4,6-dimercapto-s-triazine and: as chain stopping agent, 20 parts by weight of 2,4-bis-(methyl-$\beta$-hydroxyethylamino)-6-mercapto-s-triazine, are dissolved in a mixture of 2-ethoxyethanol acetate and xylene. To this solution is then added a solution, in the same solvent mixture, of 21 g of a polyisocyanate produced from 1 mole of water with 3 moles of hexamethylene diisocyanate. This lacquer solution is sprayed on to aluminium sheets. After evaporation of the solvent, the films are hardened for 10 minutes at 180° in an oven. The thus produced films have a Sward Zeidler Rocker Hardness of 130.

The same lacquer mixture is pigmented with 20 percent titanium dioxide, sprayed on to aluminum sheet and the films are hardened for 7 days at 25°. The films exhibit no yellowing after 1,500 hours exposure to xeno and no loss of luster. They also have a high stability to spindle-oil, 5 percent acetic acid, 5 percent sodium hydroxide solution, margarine and 50 percent ethyl alcohol.

EXAMPLE 75

Urethane lacquer from polydimercapto-s-triazines substituted with hydroxyl groups.

50 g of copolymer having a hydroxyl number of 92 [mg KOH/g polymer] and an inherent viscosity of 0.21 and produced according to the method described under 2f by hydrogen peroxide oxidation of a mixture from 173 parts by weight of 2-di-n-hexylamino-4,6-dimercapto-s-triazine and 130 parts by weight of 2-(n-butyl-$\beta$-hydroxyethyl-amino)-4,6-dimercapto-s-triazine, are dissolved in 50 g of methylisobutyl ketone. The solution is mixed with an ethyl acetate solution of 25 g of a polyisocyanate, produced by reaction of 3 moles of toluylene diisocyanate with 1 mole of 1,1,1-trimethylol propane. The lacquer solution is pigmented with 20 percent titanium dioxide, sprayed on to aluminum sheets and hardened for three days at 25°. As expected in the case of aromatically substituted urethanes, the films have poor stability to light. They are yellowed after only 200 hours Xenotest. Their resistance to the action for 1 hour at room temperature of concentrated hydrochloric acid, 30 percent sodium hydroxide solution and acetic acid is excellent.

If the copolymer and the diisocyanate in example 75 are replaced by a polymer or copolymer and a diisocyanate of the following table III, with the procedure being otherwise as described in the example, then cross-linked polymers are obtained with the given properties.

The "moles" in table III indicate with how many moles of diisocyanate an amount of polymer or copolymer, produced from 1 mole of monomer 1 or 1 and 2, is cross-linked.

TABLE III

Polymer or Copolymer consisting of: monomer 1 and 2

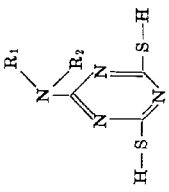

| Example No. | Monomer 1 | Weight percent Monomer 2 | Weight percent | Diisocyanate | Mol | Filmhardness (Pencil-hardness) | Further film properties |
|---|---|---|---|---|---|---|---|
| 76 | $R_1=C_8H_{17}$; $R_2=CH_2CH_2\underset{CH_3}{\overset{OH}{C}}$ | 100 | | p-Xylylene-w-w'-diisocyanate | 0.5 | 4H | Brittle. |
| 77 | $R_1=R_2=CH_2CH_2OH$ | 100 | | Chlorobenzene-2,4-diisocyanate | 0.25 | 8H | Very brittle. |
| 78 | $R_1=R_2=CH_2CH_2OH$ | 100 | | Hexamethylene-diisocyanate | 0.5 | 8H | Do. |
| 79 | $R_1=C_{18}H_{37}$; $R_2=CH_2CH_2OH$ | 100 | | Diphenylmethane-4,4'-diisocyanate | 0.30 | 4B | Adhesive. |
| 80 | $R_1=CH_2CH_2OCH_3$; $R_2=CH_2CH_2OH$ | 100 | | Diisocyanate dimerised from oleic acid (Belgian Pat. 608'214). | 0.20 | 4B | Elastic/dull. |
| 81 | $R_1=R_2=CH_2CHC_6H_{16}$<br>$\qquad\quad C_2H_5$ | 50 | 50 | Hexamethylene-diisocyanate | 0.5 | B | Orange peel effect. |
| 82 | $R_1=C_8H_{17}OCH_2CH_2$; $R_2=CH_2CH_2OH$ | 100 | | Diphenylether-4,4'-diisocyanate | 0.4 | 3B | Adhesive. |
| 83 | $R_1=R_2=C_6H_{13}$ | 50 | 50 | 3,3-diisocyanate-4,4'-dimethyl-diphenylurethdion. | 0.16 | 3H | Glass-clear. |
| | $R_1=CH_2CH-C_4H_9$; $R_2=CH_2CH$<br>$\qquad\quad C_2H_5\qquad\qquad\qquad\quad OH_5$<br>$\qquad\qquad\qquad\qquad\qquad\qquad OH$ | | | | | | |
| 84 | $R_1=R_2=C_4H_9$ | 70 | 30 | 4,4'-diphenyl-diisocyanate | 0.3 | 4H | Brittle. |
| | $R_1=R_2=CH_2CH_2OH$ | | | | | | |

EXAMPLE 85

Production of a polydimercapto-s-triazine cross-linked with trithiocyanuric acid.

10.4 g of monoammonium salt of the 2-di-n-hexylamino-4,6-dimercaptotriazine and 0.2 g of trithiocyanuric acid are dissolved in a mixture of 50 ml of toluene and 50 ml of dimethyl sulphoxide, and acidified with about 2 ml of acetic acid. 10 ml of 11.4 percent hydrogen peroxide solution are added dropwise to the above vigorously stirred solution within 0.5 hours. Stirring proceeds at 40° until the mixture gels. To obtain the polymer, washing is performed with methanol in the domestic mixer. The dried polymer (yield 7.5 g) is only severely swelled by toluene, butyl acetate and chloroform. It dissolves partially in warm dimethyl sulphoxide.

What is claimed is:

1. Polydimercapto-s-triazines, consisting of
   a. 0 to 100 percent by weight of the repeating unit of formula I

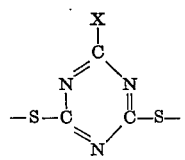

(b) 0 to 50% by weight of the repeating unit of Formula II

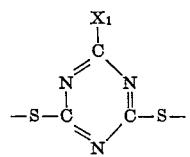

(c) 0 to 34% by weight of the repeating unit of Formula III

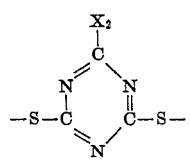

wherein

X, $X_1$, $X_2$ are a five- to seven-membered nitrogen containing heterocyclic group bound by way of nitrogen to the triazine ring; alkoxy; hydroxyalkoxy; phenoxyalkoxy; alkoxyalkoxy having at most 18 carbon atoms; cycloalkoxy having five to 12 carbon atoms; alkenyloxy having three to 18 carbon atoms; monocarbocyclic aralkoxy with seven to 12 carbon atoms; monocarbocyclic aralkoxy with seven to 12 carbon atoms substituted by lower alkyl, lower alkoxy, bromine or chlorine; phenoxy; phenoxysubstituted by halogen; or the group

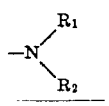

wherein $R_1$ is alkyl; alkoxycarbonaylalkyl; alkoxyalkyl; carbacyloxyalkyl having at most 20 carbon atoms; allyl; methallyl; cyclohexyl; benzyl; benzyl with at most 15 carbon atoms substituted by alkyl, alkoxy, bromine, or chlorine; and $R_2$ is hydrogen or as defined for $R_1$ with the proviso that in X the sum of the carbon atoms free of double bonds and of the optionally present oxygen and nitrogen atoms is at least seven, and in $X_1$ the sum of the carbon atoms is at least three; and d. 0 to 100 percent by weight of the repeating unit of formula IV

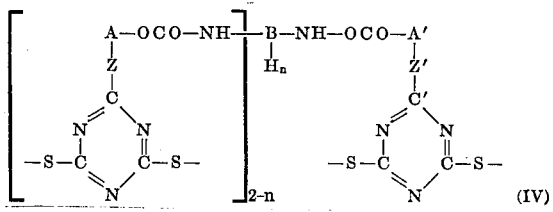

wherein

Z and Z' are independently of each other, —O—, —S—, or —NR— whereby R is hydrogen, alkyl or alkoxyalkyl both having at most 20 carbon atoms, or benzyl, benzyl substituted by alkyl, alkoxy, bromo or chloro A and A' are independently of each other alkylene having two to three carbon atoms;

E—$H_n$ is—when n is 1-alkylene of from two to 36 carbon atoms; ω,ω'-xylylene; m-phenyl; m-phenyl substituted by lower alkyl, bromine or chlorine; p-phenyl; p-phenyl substituted by lower alkyl, bromine or chlorine; a group of the formula

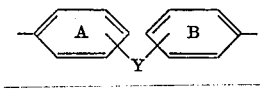

wherein A and B rings can be substituted by lower alkyl or chlorine and Y is a covalent bond, methylene, alkylidene of from two to four carbon atoms;

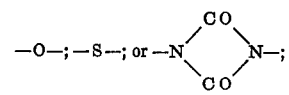

is when n is 0 — the group

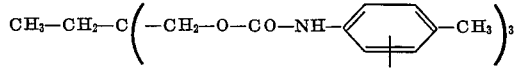

or

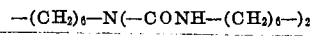

whereby heteroatoms contained in X, $X_1$, $X_2$, A, A', Z, Z', and E or bound to these groups must be separated from each other by at least one trigonal carbon atom, or by at least two carbon atoms; or instead of (d)

e. 0 to 3 percent by weight of the repeating unit of formula V

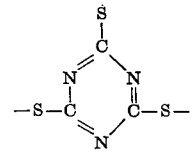

provided that either the repeating unit IV or V are present in a polymer but not both; whereby the percentages are relative to the total weight of the polymer, and the repeating units I, II, III, and IV or I, II, III, and V together constitute 100 percent of the polymer, and the polymer has an inherent viscosity of at least 0.02 in toluene at 25°C.

2. Polydimercapto-s-triazine consisting of
   a. 0 to 100 percent by weight of the repeating unit of formula I

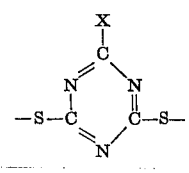

(b) 0 to 50% by weight of the repeating unit of Formula II

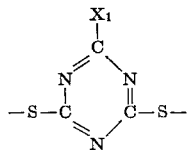
(II)

(c) 0 to 34% by weight of the repeating unit of Formula III

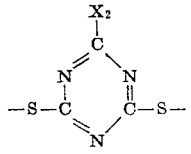
(III)

wherein

X, $X_1$, $X_2$ are a five- to seven- membered nitrogen containing heterocyclic group bound to the triazine ring by the way of the nitrogen atom; alkoxy; hydroxyalkoxy; phenoxyalkoxy; alkoxyalkoxy having at most 18 carbon atoms; cycloalkoxy having five to 12 carbon atoms; alkenyloxy having three to 18 carbon atoms; monocarbocyclic aralkoxy with seven to 12 carbon atoms substituted by lower alkyl, lower alkoxy, bromine or chlorine; phenoxy substituted by halogen or the group

wherein $R_3$ is alkyl; carboxyalkyl; alkoxycarbonylalkyl; hydroxyalkyl; alkoxyalkyl; carbacyloxyalkyl, with at most 20 carbon atoms; alkyl; methallyl, cyclohexyl; benzyl, benzyl with at most 15 carbon atoms substituted by alkyl, alkoxy, bromine, or chlorine; and $R_4$ is hydrogen or as defined for $R_3$ with the proviso that in X the sum of the carbon atoms free of double bonds and of the optionally present oxygen and nitrogen atoms is at least 7, and in $X_1$ the sum of the carbon atoms is at least three, said polydimercapto-s-triazine has an inherent viscosity of at least 0.02 in toluene at 25°C.

3. Polydimercapto-s-triazines as defined in claim 2 wherein X, $X_1$, and $X_2$ are alkoxy with at most 18 carbon atoms; phenoxy; allyloxy; ethoxyethoxy; phenoxy substituted by chlorine; benzyloxy; cyclohexyloxy; or

wherein $R'_3$ is alkyl with at most 20 carbon atoms, hydroxyalkyl, allyl, methallyl, cyclohexyl, benzyl, benzyl substituted by chlorine and $R'_4$ is hydrogen or as defined for $R'_3$, with the proviso that in X the sum of the carbon atoms free of double bonds and of the optionally present oxygen and nitrogen atoms is at least seven and in $X_1$ the sum of the carbon atoms is at least three.

4. Polydimercapto-s-triazines as defined in claim 2 consisting of (a) 71 to 95%, by weight, of Formula I in which X is

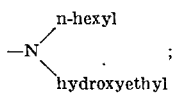

and (b) 5 to 29%, by weight, of Formula II in which $X_1$ is

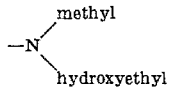

5. Polydimercapto-s-triazines as defined in claim 2 consisting of (a) 50 to 90%, by weight, of Formula I in which X is

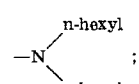

(b) 10 to 50%, by weight, of Formula II in which X' is

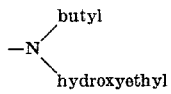

6. Polydimercapto-s-triazines as defined in claim 2 consisting of (a) 50 to 55%, by weight, of Formula I in which X is

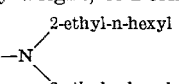

and (b) 45 to 50%, by weight, of Formula II in which X' is

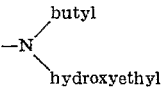

7. Polydimercapto-s-triazines as defined in claim 2, consisting of (a) 50 to 70%, by weight, of Formula I in which X is

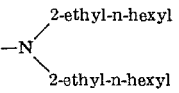

(b) 30 to 50%, by weight, of Formula II in which X' is

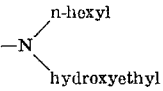

8. Polydimercapto-s-triazines as defined in claim 2 consisting of (a) 50 to 55%, by weight, of Formula I in which X is

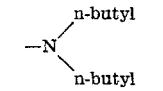

(b) 45 to 50%, by weight, of Formula II in which X' is

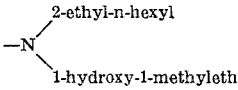

9. A polymer of claim 1 wherein —Z—A— and Z'—A'— are independently of each other aminoethyl of the formula

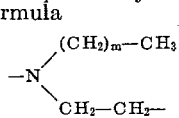

wherein m is an integer of 0 to 11.

* * * * *

PAGE 1

UNITED STATES PATENT OFFICE
CERTIFICATE OF CORRECTION

Patent No. 3,669,936    Dated June 13, 1972

Inventor(s) Franz Regenass and Peter Christoph Schlumbom

It is certified that error appears in the above-identified patent and that said Letters Patent are hereby corrected as shown below:

1) Assignee has been omitted and should be "CIBA-GEIGY Corporation" Ardsley, N.Y.

2) Column 8, line 37, "5g" should read "25g".

3) Table I, Example 7, Temperature Column, "10-50" should read "40-50".

4) Table II, Example 17, Amount g Column, "0.45" should be deleted.

5) Table II, Example 18, Yield g Column, "1.09" should read "10.9".

6) Table II, Example 25, Amount g Column, "1.6" should read "1.2".

7) Table II, Example 50, Nihn Column, "1.86" should read "1.06".

8) Table II, Examples 54 and 55, Monomer 1 Column, "n-hexyl" should read "n-butyl".

9) Table III, Example 76, Monomer 1 Column, "$R_1=C_8H_{13}$" should read "$R_1=C_6H_{13}$".

10) Table III, Example 81, Monomer 1 Column, "$H_{16}$" should read "$H_{13}$".

11) Table III, Example 83, Monomer 2 Column, "$\diagup^{OH_5}_{\diagdown OH}$" should read "$\diagup^{CH_3}_{\diagdown OH}$".

PAGE 2     UNITED STATES PATENT OFFICE
CERTIFICATE OF CORRECTION

Patent No. 3,669,936                    Dated   June 13, 1972

Inventor(s)  Franz Regenass and Peter Christoph Schlumbom

It is certified that error appears in the above-identified patent and that said Letters Patent are hereby corrected as shown below:

12) Column 18, that part of the structure of lines 5 to 9,

13) Column 18, line 18, "n-phenyl; n-phenyl;" should read "n-phenylene; n-phenylene".

14) Column 19, Claim 3, structure

Signed and sealed this 15th day of May 1973.

(SEAL)
Attest:

EDWARD M. FLETCHER, JR.          ROBERT GOTTSCHALK
Attesting Officer                Commissioner of Patents